United States Patent Office 3,449,527
Patented June 10, 1969

3,449,527
CONTROL CIRCUIT FOR DIAL SELECTION OF EXTENSION TELEPHONES

Walter Strobelt and Erwin Huber, Munich, and Andreas Friese, Gauting, Germany, assignors to Siemens Aktiengesellschaft, a corporation of Germany Continuation of application Ser. No. 350,173, Mar. 9, 1964. This application Oct. 23, 1967, Ser. No. 701,493
Claims priority, application Germany, Mar. 12, 1963, S 84,112
Int. Cl. H04m 3/00
U.S. Cl. 179—18 3 Claims

ABSTRACT OF THE DISCLOSURE

A circuit arrangement for a centrally controlled telephone P.A.B.X system. A special non-selected connecting line is provided to be connected with a seized incoming trunk line dependent upon the existence of a predetermined switching condition in the trunk circuit. A centrally arranged conversion device is provided in each of the trunk line circuits to evaluate different switching conditions, such as, night operation, day answering transfer, night answering transfer, or collective call. Marking relays are operatively connected to the conversion device and are automatically energized in response to a switching condition to designate within a coupling field the connection station corresponding to such switching condition.

BACKGROUND OF THE INVENTION

*Field of the invention*

This is a continuation of our co-pending application Ser. No. 350,173, filed Mar. 9, 1964 and now abandoned.

The invention relates to private automatic branch telephone exchange systems (P.A.B.X telephone systems) and particularly to a P.A.B.X in which an extension can be selected from an external exchange by dialing the extension number concerned.

SUMMARY OF THE INVENTION

The invention consists in a P.A.B.X telephone system in which a subscriber set on the P.A.B.X can be selected from an external exchange by dialing a given subscriber's number including a translator unit adapted to provide any one of a plurality of facilities involving the automatic connection of a predetermined different subscriber set to the engaged exchange line after the given number has been dialed, the translator being arranged to provide any given one of the facilities, dependent upon the state of the seized exchange line circuit, by marking the required positions in a switching network necessary for the automatic connection of that different subscriber set appropriate for the given one of the facilities.

The circumstances in which the translator unit operates in a system in accordance with the invention are outlined below.

During the night, it is usual for the various exchange lines, or at least some of the exchange lines, to be connected directly to selected extensions. This connection of exchange lines to particular extensions is termed the night service facility.

In P.A.B.X's in which an extension can be selected from an external exchange by dialing the extension number concerned, it is usual for ringing to continue at the extension for a given period (e.g. 30 seconds) if the call to that extension is not answered. When this time has elapsed the call is automatically switched through to another extension; ringing is produced at this extension and continues until the call is answered or until the caller hangs up.

This facility is called the daytime continuous ring facility.

A corresponding facility may be available at night-time in conjunction with the night service facility. This is called the night-time continuous ring facility.

Figure 1A:
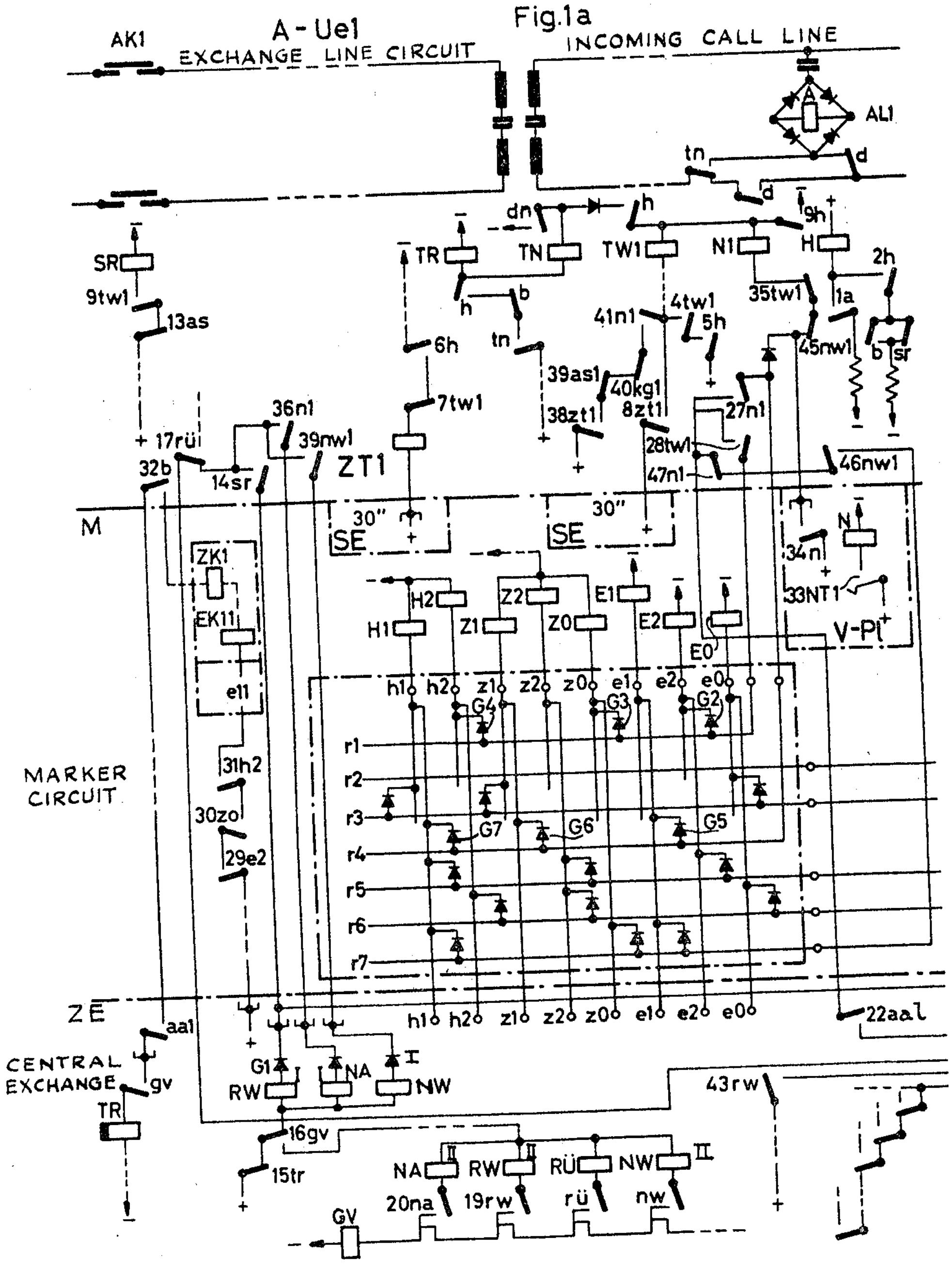
Figure 1B:
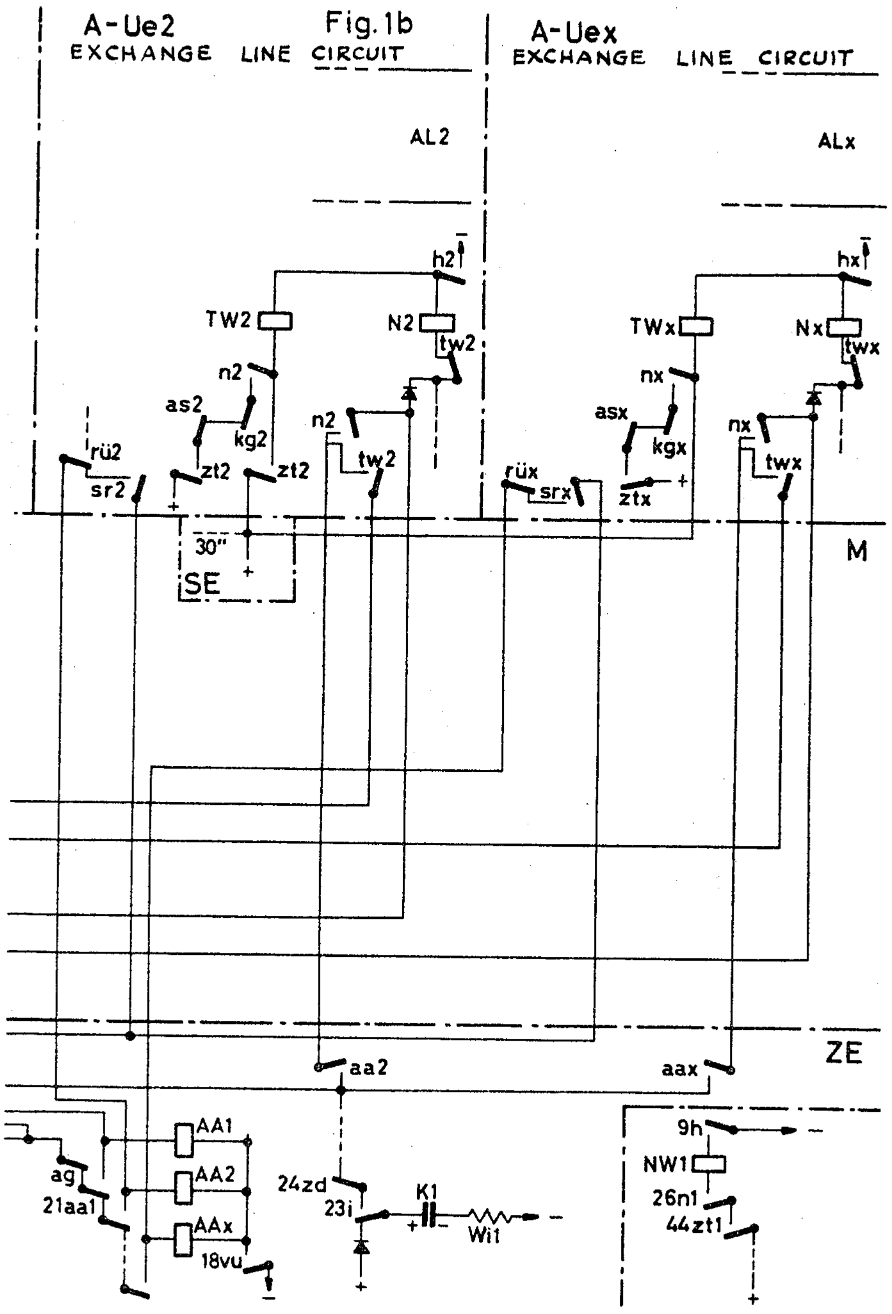

There follows a description by way of example of a method of performing the invention with reference to the accompanying drawing wherein FIGURES 1*a* and 1*b* are circuit diagrams of part of a P.A.B.X system constructed in accordance with the principles of the invention. FIGURE 1*a* is to be placed at the left of FIGURE 1*b* so as to form a continuous wiring diagram between the two figures.

Reference now being made to the drawings which shows only that part of the telephone system necessary for the understanding of the present invention. A complete telephone system to which the present invention applies is shown in U.S. Patent 3,242,266 assigned to the same assignee.

The exchange line circuits A–U*e*1 to A–U*ex*, together with the circuit elements necessary for initiating connection to special, non-dialed extensions, provide night service, daytime continuous ring and night-time continuous ring facilities. A common marker M is allotted to the exchange line circuits, A–U*e*1 to A–U*ex* illustrated. This marker may in addition be commonly allotted to further transfer units for extension traffic.

For converting various facilities into terms of specific indication in a circuit, a jumper wire system or alternatively any other desired translator device having an appropriate input and output may be employed. For example, the marker M may be allotted an easily interchangeable jumper wire system via which extension subsets for the reception of calls in might service operation, daytime continuous ring operation and night-time continuous ring operation can be indicated.

In addition to the marker, a central control unit ZE is provided which is chiefly responsible for controlling the successive seizing of the marker and of the exchange line circuits. For example, the central control unit ZE prevents simultaneous connection of several exchange line circuits to the marker or to itself.

In the central control unit ZE, a series network is provided which makes the sequence of demands to the central control unit additionally dependent upon the state of the exchange line circuit (relay NA for night service state, RW for continuous ring state, NW for night-time continuous ring state, etc.)

In the event of an incoming call via the incoming exchange line AL1, as usual, a relay A, of FIGURE 1*a*, is switched in by the exchange call current. The contact 1*a* switches in a relay H of the exchange line circuit A–U*e*1. This establishes a holding circuit for the relay H via the contact 2*h*. Contacts of the relay H effect seizing of the exchange line circuit A–U*e*1 (this procedure is not illustrated) and prepare for the setting up of the exchange selector AK1.

Where there is provision for dialing an extension from an outside exchange, a calling subscriber (e.g. on the local exchange) who is calling the P.A.B.X system via the exchange line circuit A–U*e*1, can by dialing a code digit or digits, set the selector to the desired extension on the P.A.B.X exchange or, where larger P.A.B.X exchanges are involved, set up the exchange group selector to switch through further group selectors and/or line selectors. If there is no outside exchange dialing provision, then the call from the exchange is switched through to a switchboard in the P.A.B.X. When the desired subscriber replies, in the exchange line circuit a relay VH is switched in, this is not illustrated in the drawing. If, however, the desired subscriber does not reply within a time determined by a meter, e.g. within 30 seconds, then the following circuit is established for the relay ZT1 of the automatic translator.

(1) +, 30″1, ZT1, 7*tw*1, 6*h* . . ., —

The contact 8*zt*1 establishes a circuit for the daytime continuous ring relay TW1.

(2) +, 30″9, 8*zt*1 . . ., TW1, 9*h*—

The relay TW1 is held via the contacts 4*tw*1 and 5*h* until the exchange line circuit is cleared. The closure of the contact 9*tw*1 establishes a circuit for the relay SR.

(3) + . . ., 13*as*, 9*tw*1, SR, —

The closing of the contact 14*sr* results in the establishment of a circuit for the relay RW in the central control unit ZE if the contact 18*vu* in this central unit has been switched in readiness.

(4) +, 15*tr*, 16*gv*, RW(I), G1, 14*sr*, 17*ru*, AA1 18*vu*, —

After the relay RW has been switched in, the holding circuit for this relay is established on condition that at the same time that no other demand with a higher priority, i.e. in the circuit illustrated a night service call, is being received in the central unit ZE. The relay GV is energized by a winding (not shown) when the central control unit is seized. The holding circuit for the relay RW is then as follows:

(5) +, 15*tr*, 16*gv* . . ., RW(II), 19*rw*, 20*na* . . ., GV, —

Operation of the change-over contact 16*gv* to complete this holding circuit also blocks the central unit against further seizing.

If the central unit ZE is not free and the contact 16gv has been actuated previously, then the signal from the internal exchange line circuit A–U*e*1 is maintained until the contact 16*gv* is placed in the rest position and circuit 4 is established.

The holding circuit via the contact 21*aa*1 is only established for the relay AA1, this relay indicating the demands made through the exchange line circuit A–U*e*1, as long as no simultaneous signal from another exchange line circuit and intended for a relay having higher priority in the sequence of *aa*-contacts that the relay AA1, is received. The holding circuit for the relay AA1 is established in dependence upon the contact 43*rw* of the relay RW. The establishment of the holding circuit for the relay AA1 results in the formation, via the contact 22*aa*1, of a marking circuit e.g. for the daytime continuous ring position allotted to the exchange line circuit A–U*e*1, the change-over contact 23*i* having being operated by the relay AA1 in a manner not shown, as a preliminary to marking. Therefore the circuit is completed as follows:

(6) K1+, 23*i*, 24*Zd*, 22*aa*1, 28*tw*1,
G2, *e*2—wire, E2
G3, Z0—wire, Z0, Battery, W*i*1 K1—
G4, *h*2—wire, H2

Thus, in this circuit the marker relays H2, Z0 and E2 are switched in. This means, in this example, that extension 202 is the daytime continuous ring extension. Hence, in this case a circuit is established via the contacts 29*e*2, 30*z*0, 31*h*2 and via other contacts (not illustrated) building up a path which leads via free intermediate lines, so that the coupling relays EK11 and ZK1 are energized. The energization of these coupling relays results in connection to the marked extension (i.e. 202) provided as daytime continuous ring extension for calls arriving through the exchange line AL1 to the seized exchange line circuit A–U*e*1; contact 32*b* is closed to indicate that extension 202 is the daytime continuous ring extension for the exchange line AL1.

Thus, with the marker jumper wires distributed as shown in the drawing via the jumper wire system *r*1 a daytime continuous ring position is indicated for the exchange line circuit A–U*e*1, but no daytime continuous ring extension is provided via the jumper wire *r*2 for the exchange line circuit A–U*e*2, while via the wire system *r*3 a daytime continuous ring extension 110 is provided for the exchange line circuit A–U*ex*. These daytime continuous ring positions are determined by the rectifier bridges which are in each case soldered into appropriate positions in the marker M. On occurrence of the appropriate circuit state in the seized exchange line circuits, the appropriate daytime continuous ring extension is therefore connected up. However, one and the same daytime continuous ring extension can serve several exchange line circuits. In this event, via the particular contact *tw* (i.e. 28*tw*1 or *tw*2 or *twx*) allotted to the exchange line circuit via one and the same jumper wire (i.e. via the same rectifiers), the same marking relays are switched in. However, if an exchange line circuit is allotted a night service extension which is identical with the daytime continuous ring extension, let us consider for example the exchange line circuit A–U*e*1, then via the contact *n* in this exchange line circuit and via the jumper wire system for the daytime continuous ring extension, the night service extension too will be indicated by the same marking relays indicating an extension number which corresponds to a specific circuit state in an exchange line circuit. Identical marking relays can quite simply be allotted for each circuit state but it is equally possible to use different ones.

If, at the switchboard position, the key 33NT1 is actuated, then the exchange line circuit A–U*e*1 is switched to night service operation. The switching to night service operation of the remaining exchange line circuits A–U*e*2 to A–U*ex* can be controlled by the same key or, alternatively, by other (day and night) transfer keys. Actuation of the key 33NT1 switches in the relay N. Provided that there is an incoming exchange call through the exchange line AL1 and that the relay H is switched in, the contact 34*n* establishes a circuit for the relay N1.

(7) +, 34*n*, 45*nw*1, 35*tw*1, N1, 9*h*

Closing of the contact 36*n*1 results in the application of a signal to the central control unit ZE and the relay NA is switched in once contact 16*gv* is in the rest position showing that the central unit is free. Where several signals arrive simultaneously at the central control unit, a holding circuit for the relay NA can be established in accordance with a priority system. In the energizing circuit (equivalent to circuit 4) of the relay NA the relay AA1 is also included, this latter ensuring that only one exchange line circuit can be switched through to the central unit ZE at a time, such connection being established via the network of contacts (*aa*). The closing of the contact 22*aa*1 establishes the following marking circuit for the night service extension allotted to the exchange line AL1.

(8) K1 +, 23*i*, 24*zd*, 22*aa* 1, 27*n*1
G5, *e*1—wire E1
G6, *z*1—wire, Z1, Battery, W*i*1, K1—
G7, *h*1—wire, H1

This circuit includes the relays H1, Z1 and E1 and these are switched in thus marking extension 111 as the night service extension. Through the agency of the circuit formed by contacts of the relays H1, Z1 and E1, coupling contacts of coupling relays (EK) and (ZK) are closed depending upon the position of a contact, corresponding to the contact 32*b*, which indicates the exchange line circuit A–U*e*1. This part of the circuit corresponds to that described above for establishing a connection to extension 202 and is not shown here. The extension number 111 marked as the night service extension, is connected to the exchange line circuit A–U*e*1 and thus to the calling exchange subscriber via the exchange line AL1. The cut-off relay TR in the same circuit as the coupling relay, clears the central control unit ZE.

The exchange line circuit A–U*e*1 may be so designed that in the event that the night service extension e.g. 111, fails to reply, the relay ZT1 is switched in after a specific time has elapsed. This relay is switched in circuit 1. In this event, the following circuit is established for the relay TW.

(9) +, 38$zt$1, 39$as$1, 40$kg$1, 41$n$1 . . . , TW1, 9$h$, —

The contact 35$tw$1 switches the relay N1 (circuit 7) out. In a manner not illustrated, the connection between the night service extension and the exchange line circuit is then broken. The coupling relays which have been switched in are switched out again. As explained earlier, the switching in of the relay TW1 results in the marking out of the night service extension but of the daytime continuous ring extension, which in this case also serves as night-time continuous ring position.

Alternatively, if the night service extension fails to reply, instead of the relay TW1 being switched in, a relay NW1 can be switched in, given that the contact 26$n$1 has been actuated, by closure of the contact 44$zi$1. In this instance, there are no contacts for making the circuit 9. The contacts of the relay NW1 can then, in a corresponding manner to the relay RW used for daytime continuous ring position, mark the night-time continuous ring position. To this end, a special relay NW is provided in the central control unit. This relay UW is operated in a similar manner to the relay RW used for daytime continuous ring operation, and is in fact controlled by the closure of the contact 39$nw$1. The jumper wire system $r$7 is provided in the marker M for indicating the night-time continuous ring extension in the case of the exchange line circuit A–U$e$1. In a similar manner to daytime continuous ring operation, this jumper wire system is employed to switch in the hundreds, tens and units relays which indicate the night-time continuous ring extension. Marking is effected after the contact 45$nw$1 has switched out the relay N1 via the contacts 47$n$1 and 46$nw$1.

The jumper wire system $r$1 to $r$7 for night-time continuous ring operation and day and night continuous ring operation, is so arranged that the wiring can be in printed circuit form on a plug-in board and all that is necessary is to solder in the requisite rectifiers. Rapid changing of the whole wiring is effected as required simply by plugging in a specific board. The board connection points are indicated in the drawing. Via the wires $h$1, $h$2, $z$1, to $z$0 and $e$1 to $e$0, even where the establishment of normal connections is concerned, in each case the relays for indicating the exchange position to be called at the P.A.B.X. installation are marked. This is effected by the switching in, in each case, of units, tens and hundreds relay; via contacts of these relays, coupling relay, e.g. EK11 and ZK1 in the coupling bank are switched in.

Depending upon the existence of an appropriate circuit state in a seized exchange circuit, e.g. A–U$e$1, it is possible, via an available wire system or via special wiring or, again via the wiring $r$1 for indicating a daytime continuous ring extension, to indicate an extension number with more than one extension line and subset which can be used in the usual manner as an alternative subset if the first one is found to be engaged. Connection to the alternative extension subset must take place only when the first is engaged (this is indicated in the exchange line circuit); transfer is made from first to second subset (an indication of this being contained in the central control unit) in dependence upon a transfer network. As many multi-line extensions may be provided as desired.

Thus, with the technique described, in which for the exchange line circuits of all trunk lines a centrally located jumper wire system is provided, it is possible to indicate a specific extension for any given circuit state. The extension thus indicated is then connected in known fashion with the exchange line circuit concerned.

We claim:

1. In a P.A.B.X telephone system comprising, in combination: an incoming call line circuit connectible to an external calling exchange; an internal exchange line circuit connectible to a plurality of extensions; a translator unit connected between said incoming call line circuit and said internal exchange line circuit, said translator unit including first, second and third switch means to effect respectively first, second and third predetermined facilities; selector means connected to said translator unit for selecting at least one of said predetermined facilities to cause ringing of one of said plurality of extensions in accordance with the facility selected.

2. In a P.A.B.X telephone system according to claim 1 further including: time delay switch means connected in circuit with said translator unit to automatically transfer an incoming call which is ringing said one of said plurality of extensions to another preselected extension after a predetermined period of time.

3. In a P.A.B.X telephone system according to claim 2 wherein said first, second and third switch means includes means for causing said first, second and third facilities to operate as a night service facility, a night-time continuous ring facility, and a daytime continuous ring facility respectively.

References Cited

UNITED STATES PATENTS

| | | | |
|---|---|---|---|
| 2,501,546 | 3/1950 | Stehlik | 179—26 |
| 3,176,080 | 3/1965 | Gazert et al. | 179—26 |
| 3,242,266 | 3/1966 | Strobelt et al. | 179—18.02 |

WILLIAM C. COOPER, *Primary Examiner.*